United States Patent
Kodama

(10) Patent No.: US 8,956,786 B2
(45) Date of Patent: Feb. 17, 2015

(54) VOLUME HOLOGRAM MEDIUM

(75) Inventor: Daijiro Kodama, Tokyo (JP)

(73) Assignee: DAI Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 11/851,088

(22) Filed: Sep. 6, 2007

(65) Prior Publication Data

US 2008/0055685 A1    Mar. 6, 2008

Related U.S. Application Data

(63) Continuation of application No. 10/615,399, filed on Jul. 9, 2003, now abandoned.

(30) Foreign Application Priority Data

Jul. 9, 2002 (JP) ................. 2002-199832

(51) Int. Cl.
*G03H 1/04* (2006.01)
*G03H 1/02* (2006.01)
(Continued)

(52) U.S. Cl.
CPC .......... *G03H 1/0248* (2013.01); *G03H 1/0011* (2013.01); *G03H 1/181* (2013.01);
(Continued)

(58) Field of Classification Search
CPC ............. G03H 1/02; G03H 1/26; G03H 1/04; G03H 1/28; G03H 2210/32; G03H 2210/55; G03H 2001/0423; G03H 2001/0497; G03H 2001/269; G03H 2001/28; G03H 1/0011; G03H 1/0248; G03H 1/181; G09F 19/12
See application file for complete search history.

(56) References Cited

U.S. PATENT DOCUMENTS 3,580,655 A     5/1971  Leith et al.
3,598,484 A  *  8/1971  Redman et al. ............... 355/2
(Continued)

FOREIGN PATENT DOCUMENTS

EP      1045296     * 10/2000
EP   1 278 107 A2    1/2003
(Continued)

OTHER PUBLICATIONS

Translation of JP 62-258488.*
(Continued)

*Primary Examiner* — Martin Angebranndt
(74) *Attorney, Agent, or Firm* — Sughrue Mion, PLLC

(57) ABSTRACT

The invention is concerned with a volume hologram medium obtained by multiple recording of holograms, which is improved in terms of just only security for forgery prevention but also aesthetics. A volume hologram medium 29' comprises a reflection hologram in which a stereoscopic image of a three-dimensional object and an image of a plane pattern of a mask plate are recorded by interference of the same reference light beams having the same angle of incidence and the same wavelength with object light beams having mutually different angles of incidence. The stereoscopic image of the three-dimensional object is reconstructed in the form of diffracted light 31 in a singlecolor and in angle relations close to recording conditions, and the image of a plane pattern of the mask plate is reconstructed as diffracted light 32b, 32'b at various angles of incidence of white illumination light 30 and in different colors depending on those angles of incidence. Thus, more improved aesthetics are achievable, and more enhanced security is ensured by determination of whether or not the volume hologram medium has such aesthetic properties.

9 Claims, 9 Drawing Sheets

(51) Int. Cl.
  *G03H 1/00* (2006.01)
  *G03H 1/18* (2006.01)
  *G03H 1/22* (2006.01)

(52) U.S. Cl.
  CPC .. *G03H2001/0417* (2013.01); *G03H 2001/187* (2013.01); *G03H 2001/2231* (2013.01); *G03H 2001/2263* (2013.01); *G03H 2001/2268* (2013.01); *G03H 2210/32* (2013.01); *G03H 2210/55* (2013.01); *G03H 2210/562* (2013.01); *G03H 2223/12* (2013.01); *G03H 2223/19* (2013.01)
  USPC ........................ 430/1; 430/2; 359/24; 359/28

(56) References Cited

U.S. PATENT DOCUMENTS

| | | | | |
|---|---|---|---|---|
| 5,447,335 | A | | 9/1995 | Haslop |
| 5,497,170 | A | * | 3/1996 | Kato et al. ........................ 345/9 |
| 5,543,251 | A | | 8/1996 | Taylor |
| 5,694,229 | A | * | 12/1997 | Drinkwater et al. ............... 359/2 |
| 5,822,092 | A | * | 10/1998 | Davis ............................... 359/10 |
| 6,097,514 | A | | 8/2000 | Nishikawa |
| 6,340,540 | B1 | * | 1/2002 | Ueda et al. ........................ 430/1 |
| 6,687,031 | B1 | | 2/2004 | Kodama et al. |
| 6,728,014 | B2 | | 4/2004 | Kodama |
| 2003/0016408 | A1 | | 1/2003 | Kashiwagi et al. |
| 2003/0155495 | A1 | * | 8/2003 | Drinkwater ............... 250/237 R |
| 2003/0169468 | A1 | | 9/2003 | Manz et al. |

FOREIGN PATENT DOCUMENTS

| | | | |
|---|---|---|---|
| JP | 62-206582 A | | 9/1987 |
| JP | 62-258488 | * | 11/1987 |
| JP | 05-166017 | * | 7/1993 |
| JP | 11-024538 | * | 1/1999 |
| JP | 11-277958 A | | 11/1999 |
| JP | 2001-022255 A | | 1/2001 |
| WO | 03/066344 A1 | | 8/2003 |

OTHER PUBLICATIONS

Leith et al;., "White light hologram technique", Appl. Opt., vol. 17(2) pp. 3817-3188 (Oct. 1978).*
Tanigawa et al., "Deep image hologram recorded by using a lenticular lens sheet", Proc. SPIE vol. 3637 pp. 181-187 (Jan. 1999).*

* cited by examiner

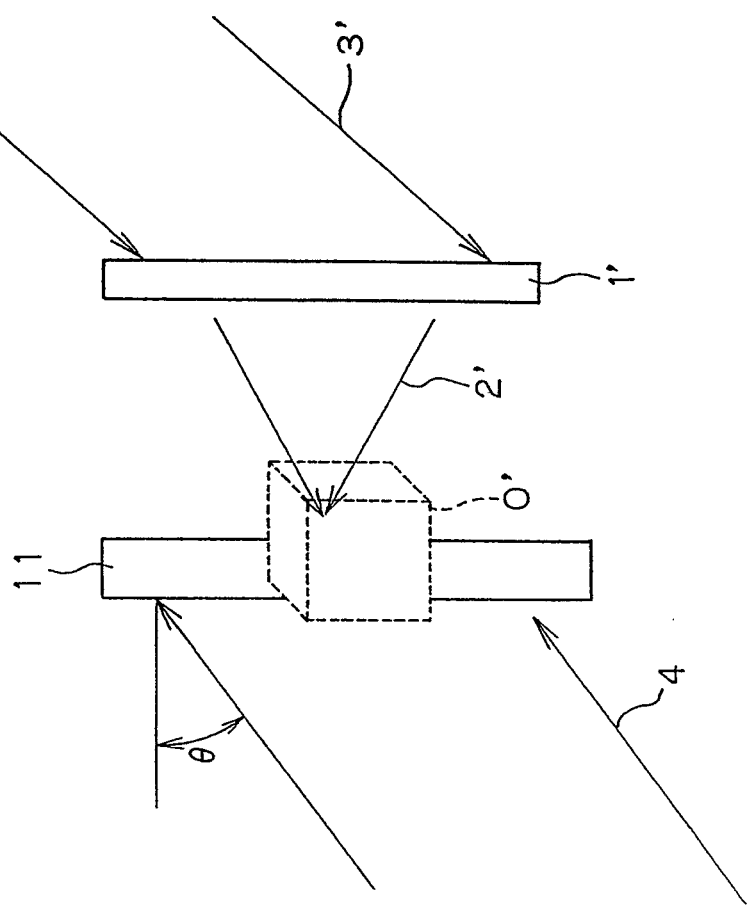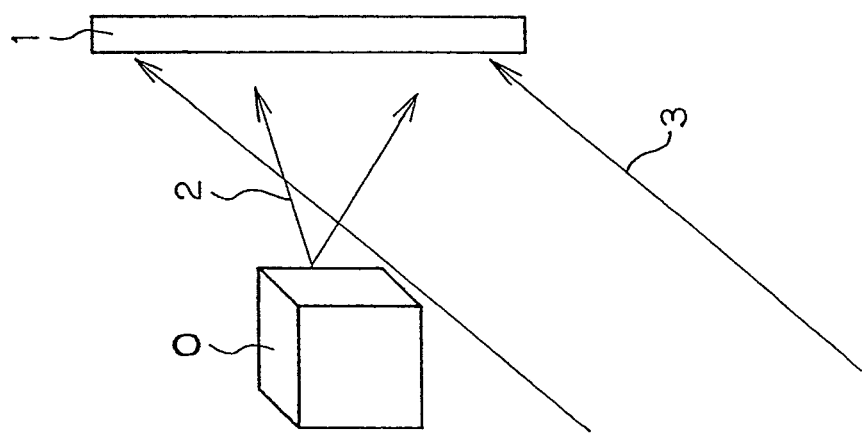

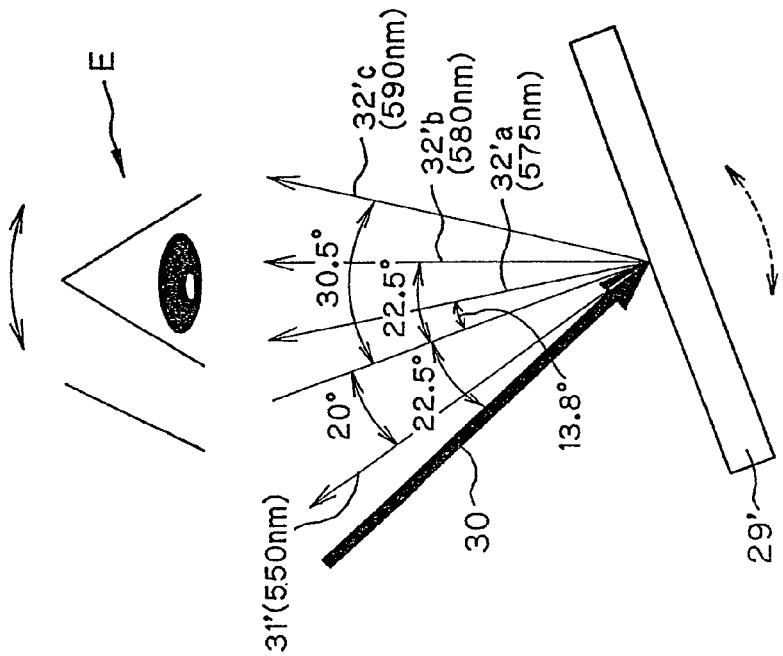
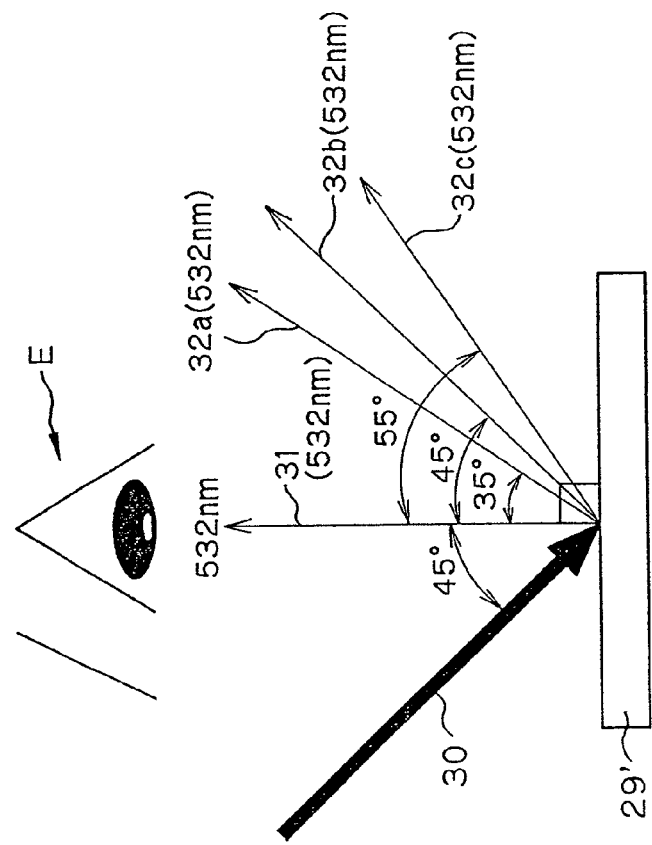
FIG. 4(a)
FIG. 4(b)

VOLUME HOLOGRAM MEDIUM

This is a continuation of application Ser. No. 10/615,399 filed Jul. 9, 2003 now abandoned. The entire disclosure(s) of the prior application(s), application Ser. No. 10/615,399 is considered part of the disclosure of the accompanying continuation application and is hereby incorporated by reference.

BACKGROUND OF THE INVENTION

The present invention relates generally to a volume hologram medium, and more particularly to a volume hologram medium improved in terms of aesthetics and security.

Patent Publication 1 proposes a hologram medium in which a stereoscopic image and a pupil image comprising a repetition of usually invisible fine patterns are recorded in a volume hologram to determine whether the hologram is genuine or fake through a pattern reconstructed pattern from that pupil image.

Patent Publication 2 proposes a hologram medium in which a volume hologram medium is deactivated in a fine repetitive pattern using ultraviolet radiation to record an object image in the remaining photosensitive area, so that whether the hologram is genuine or fake is judged by the deactivated pattern.

Patent Publication 1
JP-A 11-24538
Patent Publication 2
JP-A 11-277958

Both the hologram media proposed in the above patent publications 1 and 2 are satisfactory in terms of security, but they are not always satisfactory in terms of aesthetics because the fine patterns used for authentication are invisible.

SUMMARY OF THE INVENTION

In view of such problems with the prior art as described above, the primary object of the present invention to provide a volume hologram medium obtained by multiple recording of holograms, in which just only security for forgery but also aesthetics are improved.

According to one aspect of the invention, there is provided a volume hologram medium, characterized in that an image of a three-dimensional object and an image of a plane pattern are multi-recorded in a reflection hologram form by interference of the same reference light beams having the same angle of incidence and the same wavelength with object light beams having mutually different angles of incidence.

Preferably in this aspect, the hologram of said image of a plane pattern is selectively recorded in only an area corresponding to said plane pattern and as a hologram comprising parallel interference fringes in one section at an angle with respect to at least a recording plane.

In one specific embodiment of the invention, the hologram of the image of a plane pattern is recorded in such an angle relation that object light and reference light are incident on the recording plane at substantially identical angles of incidence on the same side with respect to the normal to said recording plane and from mutually opposite directions between the recording plane is interposed, and the hologram of the image of a three-dimensional object is recorded in such an angle relation that the center light ray of said object light is substantially vertically incident on the recording plane.

Preferably, the hologram of the image of a plane pattern is recorded by interference of object light and reference light that diffuse in only a direction crossing at right angles with that section.

The image of a plane pattern could be recorded in the form of an image of a painted design or micro-characters.

Alternatively, the image of a plane pattern could be recorded in the form of an image of an array of lines or dots.

Still alternatively, at least one of the image of a three-dimensional object and the image of a plane pattern could be multi-recorded at two or more different wavelengths.

Throughout the above embodiments of the invention, the hologram photosensitive material used comprises a photopolymer.

According to another aspect of the invention, there is provided a volume hologram medium, characterized in that a plurality of plane pattern images are multi-recorded as a reflection hologram by interference of the same reference light beams having the same angle of incidence and the same wavelength with object light beams having mutually different angles of incidence.

In this aspect of the invention, the image of a three-dimensional object is multi-recorded by interference of reference light having the same angle of incidence and wavelength as those of the reference light used for recording the plurality of plane pattern images with object light having an angle of incidence different from that of the object light used for recording to the plurality of plane pattern images.

Preferably, each hologram of the plurality of plane pattern images is selectively recorded in only an area corresponding to each plane pattern and as a hologram comprising parallel interference fringes in one section at an angle with respect to at least a recording plane.

The plurality of plane pattern images could comprise an image of the same plane pattern.

Preferably, each hologram of the plurality of plane pattern images is recorded by interference of object light and reference light that diffuse in only a direction crossing at right angles with the section.

The plurality of plane pattern images could be multi-recorded at two or more different wavelengths.

Further, the invention provides a method for authentication of a volume hologram medium having an image of a three-dimensional object and an image of a plane pattern multi-recorded in a reflection hologram form by interference of the same reference light beams having the same angle of incidence and the same wavelength with object light beams having mutually different angles of incidence, characterized in that:

an image of an array of lines or dots is recorded as said image of a plane pattern, and a pattern film on which an array of lines or dots is drawn at the same pitch as that of said plane pattern comprising an array of lines or dots is brought in alignment with said volume hologram medium, so that said volume hologram medium can be authenticated with moiré fringes created between said image of a plane pattern and a plane pattern comprising an array of lines or dots on said pattern film.

Preferably in this case, the image of a plane pattern is recorded in such a way as to be re-constructible near to the hologram plane of the volume hologram medium.

In one volume hologram medium of the invention described herein, the image of a three-dimensional object and the image of a plane pattern are multi-recorded in a reflection hologram form by interference of the same reference light beams having the same angle of incidence and the same wavelength with object light beams having mutually different angles of incidence, so that the stereoscopic image of the three-dimensional object can be reconstructed in angle relations close to the recording conditions and in a single color, and the image of the plane pattern can be reconstructed at various angles of incidence of white illumination light and in colors varying depending on those angles of incidence. It is thus possible to provide a volume hologram medium having improved aesthetics, wherein much more enhanced security is ensured by determination of whether or not the volume hologram medium has such aesthetic properties.

In another volume hologram medium of the invention, a plurality of plane pattern images are multi-recorded as a reflection hologram by interference of the same reference light beams having the same angle of incidence and the same wavelength with object light beams having mutually different angles of incidence, so that the plurality of plane pattern images can be reconstructed in the form of an image whose color changes successively at successively varying viewing positions relative to the volume hologram medium. It is thus possible to provide a volume hologram medium having improved aesthetics, wherein much more enhanced security is ensured by determination of whether or not the volume hologram medium has such aesthetic properties.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

BRIEF DESCRIPTION OF THE DRAWINGS

FIGS. 1(a) and 1(b) are illustrative of how to make a first input hologram used to prepare a volume hologram medium according to one embodiment of the invention by recording.

FIGS. 4(a) and 4(b) are illustrative of the characteristics upon reconstruction of the volume hologram medium prepared as shown in FIG. 3.

DESCRIPTION OF THE PREFERRED EMBODIMENTS

The volume hologram medium of the invention is now explained with reference to embodiments of how to record and the characteristics upon reconstruction of the resultant hologram media.

FIGS. 1(a) and 1(b) are illustrative of how to make a first input hologram 11' (FIG. 3) used to fabricate the volume hologram medium of the invention by recording. A three-dimensional object O is provided for recording a stereoscopic image in the end volume hologram medium. As shown in FIG. 1(a), the object O is located in front of a volume hologram photosensitive material 1 that comprises a photopolymer as an example. The object O is illuminated by coherent reference light 3 of a given wavelength $\lambda$ to make scattered (object) light 2 from the object O incident almost vertically on the hologram photosensitive material 1. On the other hand, coherent reference light 3 coming from the same light source as that for the illumination light and having the same wavelength $\lambda$ is obliquely directed onto the photosensitive material 1 from the same side as that for the object light 2, so that the object light 2 interferes with the reference light 3 in the hologram photosensitive material 1 to record therein a transmission hologram 1' as shown in FIG. 1(b).

Figure 3:
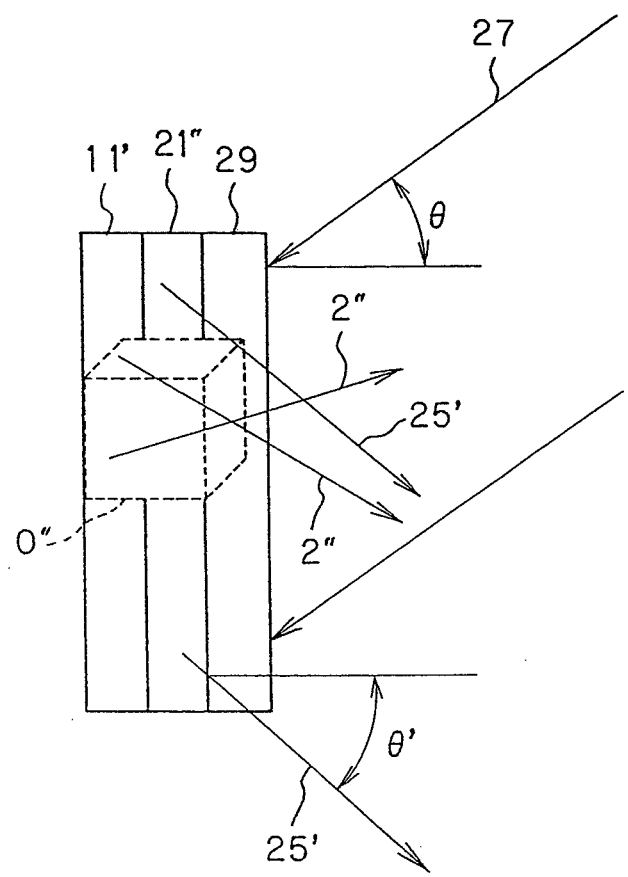
FIG. 3 is illustrative of how to fabricate a volume hologram medium according to one embodiment of the invention from the first and second input holograms.

Then, as shown in FIG. 1(b), reconstruction illumination light 3' that travels oppositely to the travel direction of the reference light 3 is entered into the transmission hologram 1' from the side opposite to the side on which the reference light 3 is incident upon recording, whereupon diffraction light 2' for reconstructing the stereoscopic image O' of the object O is diffracted to the position of the object O at which the transmission hologram 1' has been recorded. Then, another volume hologram photosensitive material 1 that comprises a photopolymer as an example is located near to the reconstructed stereoscopic image O'. Diffraction light 2' from the transmission hologram 1' is entered into the volume hologram photosensitive material 1, and coherent reference light 4 comprising substantially parallel light 4 coming from the same light source for the reconstruction illumination light 3' and having the same wavelength $\lambda$ is directed onto the opposite side of the photosensitive material 1 at an angle of incidence $\theta$, so that the diffracted (object) light 2' interferes with the reference light 4 to record therein a first input hologram 11' as shown in FIG. 3.

Figure 2B:
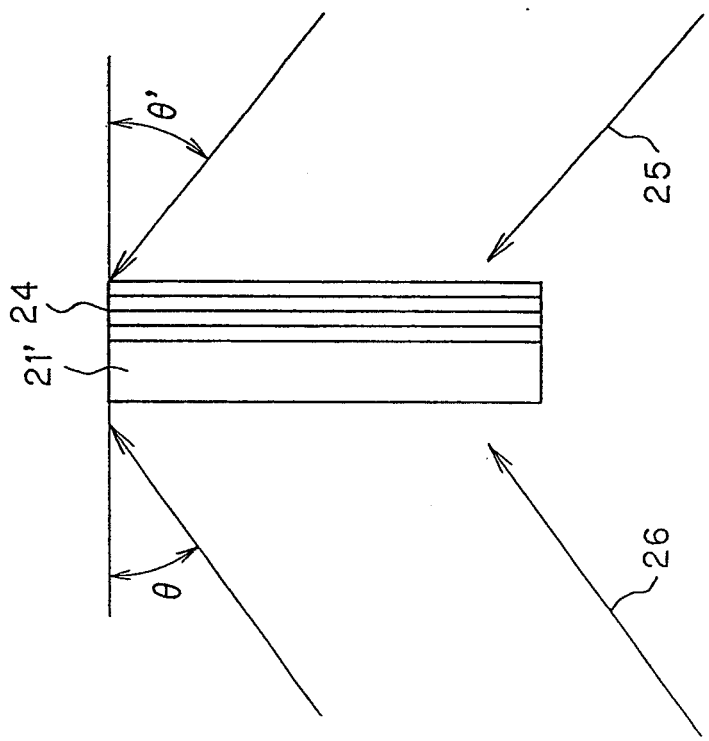
FIGS. 2(a) and 2(b) are illustrative of how to make a second input hologram used to make a second input hologram used to prepare a volume hologram according to one embodiment of the invention by recording.
Figure 2A:
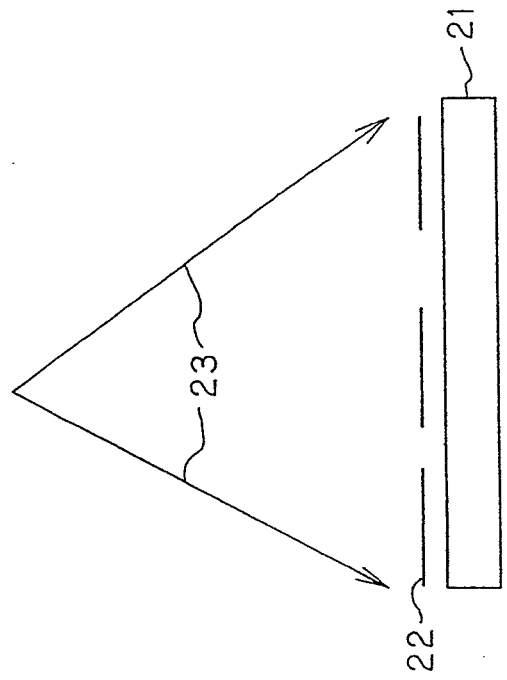

FIGS. 2(a) and 2(b) are illustrative of how to make a second input hologram 21" (FIG. 3) used to fabricate the volume hologram medium of the invention by recording. A mask plate 22 is provided for recording a plane pattern in the end volume hologram medium. This mask plate 22 has a given masked pattern that is to define the finally reconstructed plane pattern. As shown in FIG. 2(a), the mask plate 22 is located in close contact with or slightly away from a volume hologram photosensitive material 21 that comprises a photopolymer as an example. Light 23 for deactivation of the hologram photosensitive material 21 such as ultraviolet radiation is directed thereto through the mask plate 22 to deactivate portions thereof in association with openings in the mask plate 22 (or deprive them of photosensitivity).

Then, as shown in FIG. 2(b), a one-dimensional diffuser 24 providing diffusion in a one-dimensional direction alone is placed in close contact with the front surface of the partly deactivated hologram photosensitive material 21'. For such a one-dimensional diffuser 24 providing diffusion in the one-dimensional direction alone, a lenticular lens plate, a diffusing plate having ground slits in a one direction alone, etc. may be used, with the one-dimensional diffusing direction being perpendicular to the surface of the paper. With the hologram photosensitive material 21' in close contact with the one-dimensional diffuser 24, substantially parallel coherent reference light 26 having the same wavelength λ as that of reference light 4 used to make the first input hologram 11' of FIG. 1(*b*) is entered in the hologram photosensitive material 21' at the same angle of incidence θ as that of reference light 4, and coherent illumination light 25 from the same light source as that for reference light 26 is entered therein through the one-dimensional diffuser 24 at an angle of incidence θ' included within the plane of the paper. Upon passing through the one-dimensional diffuser 24, the illumination light 25 incident on the one-dimensional diffuser 24 at that angle of incidence θ is converted into light that, when projected within the plane of the paper, diffuses at the same angle θ in the vertical direction to the plane of the paper. Then, the diffuse light is entered in the hologram photosensitive material 21', so that it interferes with reference light 26 incident thereon from the opposite side at the angle of incidence θ, thereby recording the second input hologram 21" of FIG. 3 therein.

In one sectional plane of the thus recorded second input hologram 21" inclusive of reference light 26 and illumination light 25 (the plane of FIG. 2(*b*)), mutually parallel, uniform interference fringes are recorded at a slant angle parallel with a vector directing to the middles of the direction vectors of reference light 26 and illumination light 25 in the medium of the hologram photosensitive material 21'. While the illumination light 25 is here described as being entered in the plane of FIG. 2(*b*), it could be entered in the plane of the paper at any desired angle from its front or back surface. In a sectional plane of the resultant input hologram including reference light 26 and illumination light 25 (not the plane of FIG. 2(*b*)), too, mutually parallel, uniform interference fringes are recorded at a slant angle parallel with a vector directing to the middles of the direction vectors of reference light 26 and illumination light 25 in the medium of the hologram photosensitive material 21'.

Then, the first input hologram 11' prepared in the steps of FIGS. 1(*a*) and 1(*b*) is put on the second input hologram 21" prepared in the steps of FIGS. 2(*a*) and 2(*b*), as shown in FIG. 3. While a volume hologram photosensitive material 29 comprising another photopolymer is brought in close contact with the second input hologram 21", illumination light 27 that travels oppositely to reference light 4 used to make the first input hologram 11' and reference light 26 used to make the second input hologram 21" and having the same wavelength λ as do they is entered in the hologram assembly through the hologram photosensitive material 29. Illumination light 27 passing through the hologram photosensitive material 29 is entered in the first input hologram 11' to generate diffraction light 2" for reconstructing an image O" of the stereoscopic reconstructed image O'. This diffraction light 2" is then almost vertically incident on the back surface of the hologram photosensitive material 29, interfering with illumination light 27 first received at the hologram photosensitive material 29, so that reflection hologram interference fringes for reconstructing the image of the stereoscopic reconstructed image O" are copied and recorded in the hologram photosensitive material 29. The same illumination light 27 passing through the hologram photosensitive material 29 is also entered in the second input hologram 21", generating from portions thereof not deactivated by light 23 (masked portions of the mask plate 22) diffraction light 25' that travels oppositely to illumination light 25 passing through the one-dimensional diffuser 24 at the time of making the second input hologram 21", i.e., diffraction light 25' that, as projected within the plane of the paper, diffuses at an angle of diffraction θ (in the vertical direction to the plane of the paper). This diffraction light 25', too, enters the back surface of the hologram photosensitive material 29, interfering with illumination light 27 first received at the hologram photosensitive material 29, so that reflection hologram interference fringes for reconstructing a plane pattern consistent with the masked portions of the mask plate 22 are copied and recorded in the hologram photosensitive material 29. The reflection hologram interference fringes for reconstructing the image of the plane pattern consistent with the masked portions of the mask plate 22 are similar to those in the second input hologram 21", and are uniform and parallel as viewed in one section (corresponding to a plane including reference light 26 and illumination light 25 used to make the input hologram 21").

While FIG. 3 shows that the second input hologram 21" is put on the hologram photosensitive material 29, the first and second input holograms 11' and 21' could be positioned the other way around.

The characteristics upon reconstruction of the thus fabricated volume hologram medium according to one embodiment of the invention are now explained. Only for the sake of clarity, consider three cases, i.e., case (a) wherein the angles θ and θ' in FIGS. 1-3 are 45° (plus) and 35° (minus), case (b) where the angles θ and θ' are 45° (plus) and 45° (minus), and case (c) where the angles θ and θ' are 45° (plus) and 55° (minus) with the proviso that the refractive index of the volume hologram medium 29' is 1.52 with a refractive index modulation of 0.05 and a thickness of 15 μm, and the recording wavelength λ is 532 nm.

As shown in FIG. 4(*a*), white illumination light 30 for the reconstruction of this volume hologram medium 29' is entered in the volume hologram medium 29' at an angle of incidence of 45° (plus), whereupon diffraction light 31 for reconstructing the image of a stereoscopic reconstructed image O" is diffracted in the frontal direction of the volume hologram medium 29', so that the image of the stereoscopic reconstructed image O", i.e., the image of a three-dimensional object O is visible to an eyeball E of a viewer positioned in that direction. The then center wavelength of diffraction light 31 is nearly 532 nm, and so the stereoscopic image is seen in green. FIG. 6(*a*) is illustrative of the dependence of diffraction efficiency on wavelength and the angle-of-diffraction characteristics of diffraction light 31 in this state.

Referring here to the angule relation of white illumination light 30 to the volume hologram medium 29' of FIG. 4(*a*), the diffraction light for reconstructing a plane pattern image of the masked portion of a mask plate 22 is diffracted as diffraction light 32*a* in a direction having an angle of diffraction of 35° (minus) in case (a); as diffraction light 32*b* in a direction having an angle of diffraction of 45° (minus) in case (b); and as diffraction light 32*c* in a direction having an angle of diffraction of 55° (minus) in case (c). The plane pattern image, as viewed in each case in each direction, is seen in green at the center wavelength of nearly 532 nm. FIGS. 6(*b*), 6(*c*) and 6(*d*) are illustrative of the dependence of diffraction efficiency on wavelength and the angle-of-diffraction characteristics of diffraction light 32*a*, 32*b* and 32*c* in this state, respectively.

Thus, as the white illumination light 30 is entered in the volume hologram medium 29' at the angle of incidence of +45°, the image of the three-dimensional object O is seen in the same green as the recording wavelength in the frontal direction. Likewise, the plane pattern image is seen in the same green as the recording wavelength in the direction of −35° (case (a)), −45° (case (b)), and −55° (case (c)). However, ordinarily, only the stereoscopic image of the three-dimensional object O reconstructed in the frontal direction can be seen, because there is little or no case where the volume hologram medium 29' is viewed at an angle of view of, e.g., −35° to −55°.

Next, consider the case where, while both the position of a light source for the white illumination light 30 and the position of the viewer's eyeball E are fixed, the volume hologram medium 29' is positioned at an angle, as shown in FIG. 4(b). As the normal to the volume hologram medium 29' is positioned at an angle of 22.5° with respect to the white illumination light 30, diffraction light 32'a, 32'b and 32'c for reconstructing the plane pattern image of the masked portion of the mask plate 22 is diffracted at an angle of −13.8° (case (a)), −22.5° (case (b)) and −30.5° (case (c)), respectively. The light source for the white illumination light 30 and the viewer's eyeball E are fixedly positioned and at mutual angles of 45° with respect to the volume hologram medium 29' (FIG. 4(a)), and so in case (b), the viewer's eyeball E is positioned in the direction of the diffraction light 32'b so that the diffraction light 32'b is incident on the viewer's eyeball E to allow the viewer to see that plane pattern image. In case (a), the viewer's eyeball E is positioned in the direction of the diffraction light 32'a if the eyeball E is close to the white illumination light 30, and in case (c) the viewer's eyeball E is positioned is the direction of the diffraction light 32'c if the eyeball E is far away from the white illumination light 30. In both the cases, therefore, the viewer can see the plane pattern image of the masked portion of the mask plate 22. However, it is noted that in these angular arrangements the angle of the white illumination light 30 with respect to the volume hologram medium 29' is different from the angle of incidence of the illumination (reference) light 27 used for recording, and so the center wavelength of the diffraction light 32'a, 32'b and 32'c is shifted from the recording wavelength 532 nm to nearly 575 nm, nearly 580 nm and nearly 590 nm, forming a yellow green image, a yellow green-close-to-yellow image, and a yellow image, respectively. However, it is then understood that the diffraction light 31' for reconstructing the image of the three-dimensional object O is diffracted in a direction of nearly +20°; it is difficult to view that image clearly because of low diffraction efficiency in that direction. FIGS. 7(a), 7(b), 7(c) and 7(d) are illustrative of the dependence of diffraction efficiency on wavelength and the angle-of-diffraction characteristics of diffraction light 31', 32'a, 32'b and 32'c in this state.

As the white illumination light 30 is entered in the volume hologram medium 29' from the frontal direction, diffraction light 32"a, 32"b, and 32"c for reconstructing a plane pattern image of the masked portion of the mask plate 22 is diffracted at an angle of +8.4° (case (a)), 0° (frontal direction; case (b)), and −7.5° (case (c)), respectively, so that the plane pattern image becomes visible to the eyeball E of a viewer positioned in the direction corresponding to each case. The center wavelength of the diffraction light 32"a, 32"b, and 32"c is then found at nearly 585 nm (yellow), nearly 600 nm (orange close to yellow), and nearly 615 nm (orange), respectively. It is noted that the diffraction light 31" for reconstructing the image of the three-dimensional object O is diffracted in a direction of nearly +45° near to the center wavelength of 530 nm; however, it is difficult to view that image clearly because of low diffraction efficiency in that direction. FIGS. 8(a), 8(b), 8(c) and 8(d) are illustrative of the dependence of diffraction efficiency on wavelength and the angle-of-diffraction characteristics of diffraction light 31", 32"a, 32"b and 32"c in this state.

As exemplified above, when the white illumination light 30 and viewer's eyeball E are positioned in the same angule relation as is the case with the reference light 27 and object light 2" used to record the image of the three-dimensional object O, the image of the three-dimensional object O can be seen in the same color as recorded, but it is less visible in other angule relations and colors. On the other hand, the plane pattern image of the masked portion of the mask plate 22 is clearly seen even when the white illumination light 30 and viewer's eyeball E are positioned in different angule relations than that of the reference light 27 and object light 25' as they are recorded; however, the color of that image appears to vary depending on the viewing direction, and so the plane pattern image can be seen by color switching.

From FIGS. 6-8, it is seen that the peak value of diffraction efficiency of the hologram with the plane pattern image of the masked portion of the mask plate 22 recorded therein is 100% even with deviations from the hologram recording conditions (FIGS. 7(b)-(d) and FIGS. 8(b)-(d)), because uniform, parallel hologram interference fringes exist in one section. It is also seen that the peak value of diffraction efficiency of the hologram with the image of the three-dimensional object O recorded therein decreases with deviations from the hologram recording conditions, probably because of the presence of many hologram interference fringes at angles with the surface of the photosensitive material. Referring here to FIGS. 6, 7 and 8, the dependence of diffraction efficiency on wavelength is found from Logelnik's coupled-wave theory, and the angle-of-diffraction characteristics are determined from the diffraction equation.

Figure 5A:
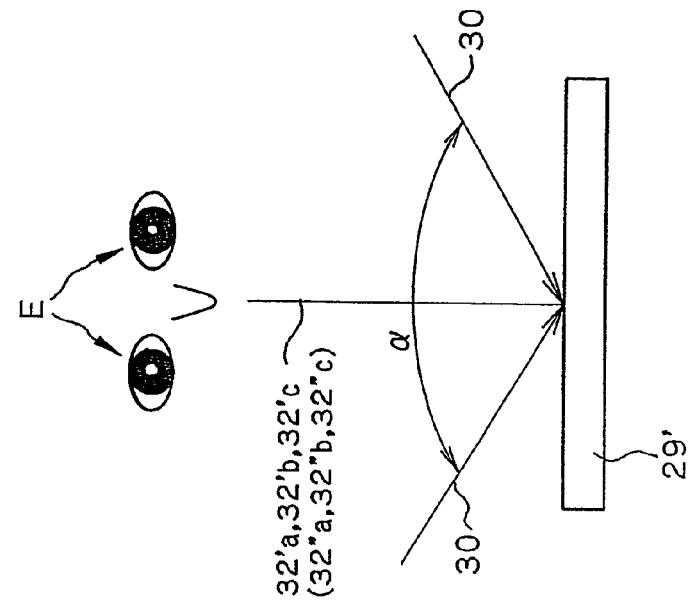
FIGS. 5(a), 5(b) and 5(c) are again illustrative of the characteristics upon reconstruction of the volume hologram medium prepared as shown in FIG. 3.
Figure 5B:
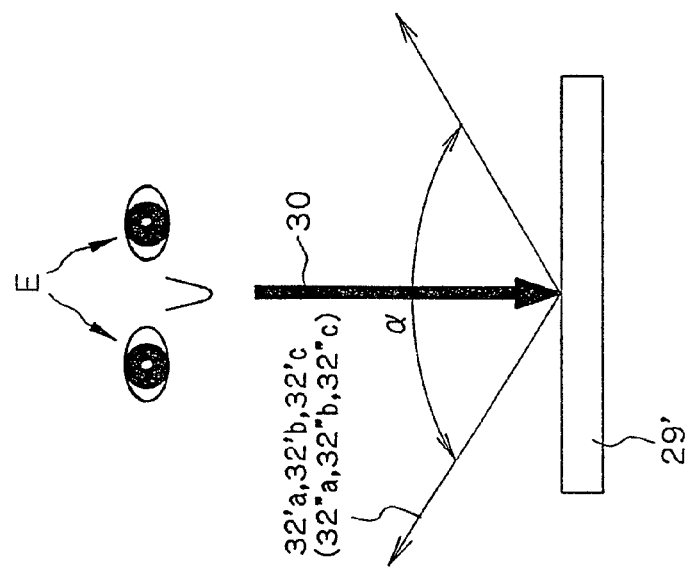
Figure 5C:
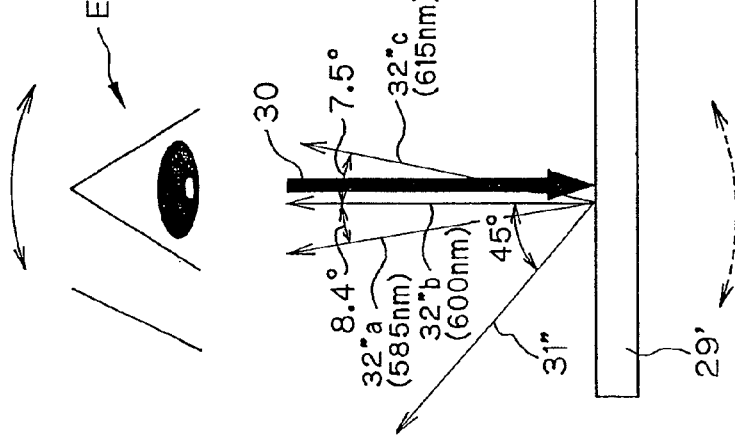
Figure 6A:
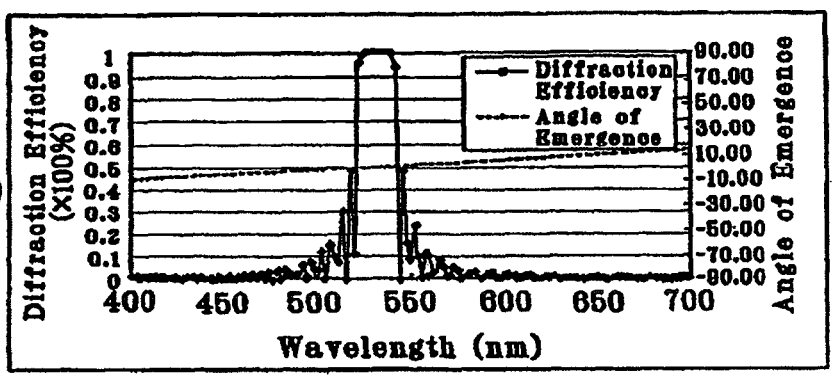
FIGS. 6(a), 6(b), 6(c) and 6(d) are illustrative of the dependence of diffraction efficiency on wavelength and the angle-of-diffraction characteristics of diffraction light for reconstructing a three-dimensional object image and diffraction light for reconstructing a plane pattern image when the volume hologram medium according to one embodiment of the invention is in one reconstruction state.
Figure 6B:
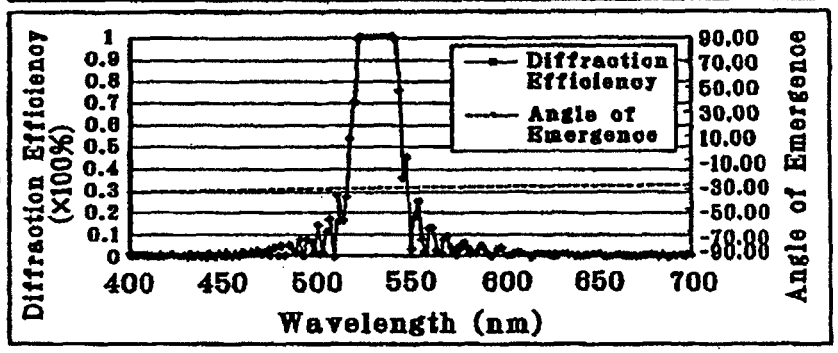
Figure 6C:
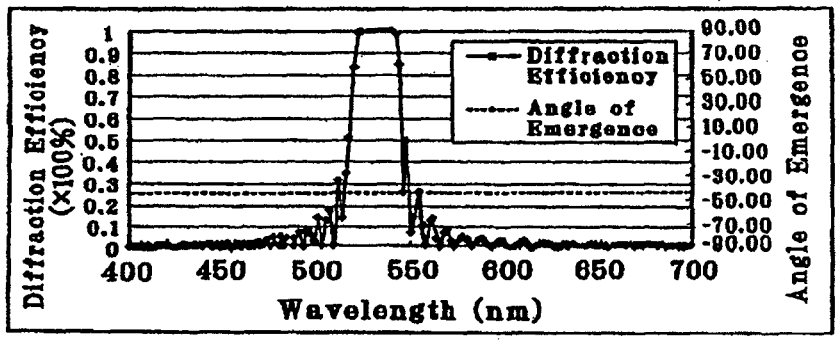
Figure 6D:
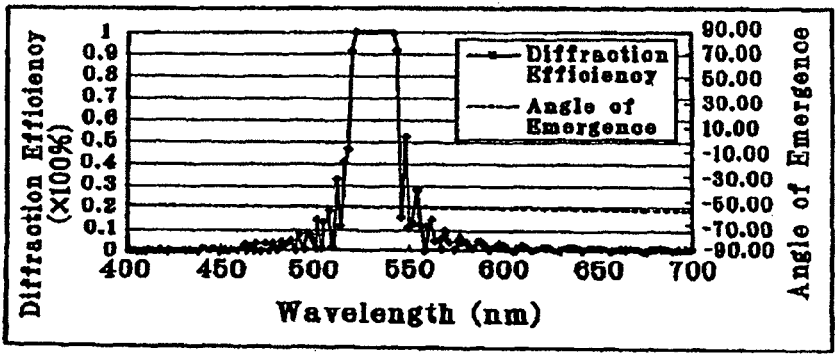
Figure 7A:
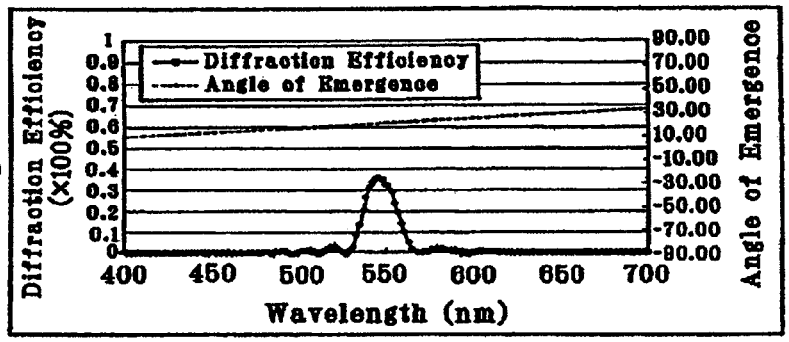
FIGS. 7(a), 7(b), 7(c) and 7(d) are illustrative of the volume hologram medium in another reconstruction state, similar to FIGS. 6(a), 6(b), 6(c) and 6(d).
Figure 7B:
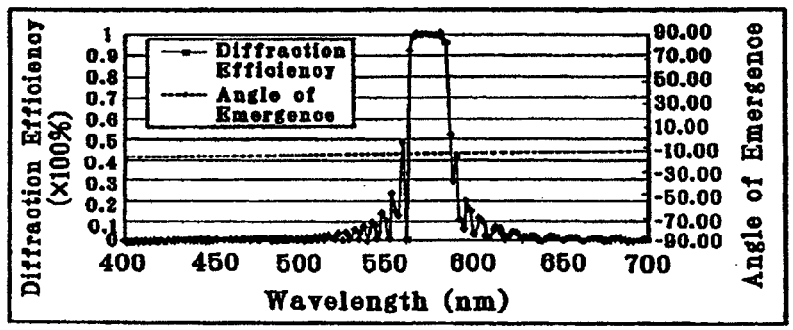
Figure 7C:
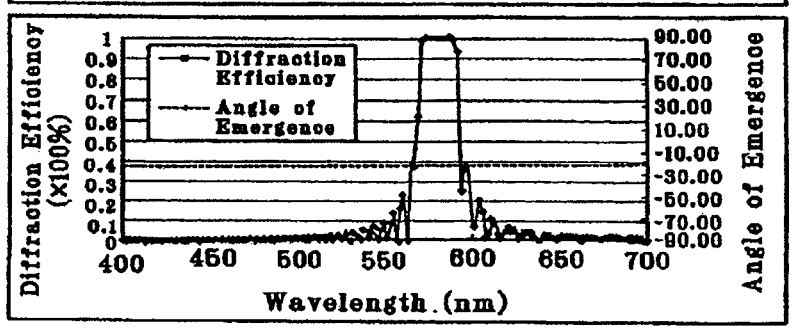
Figure 7D:
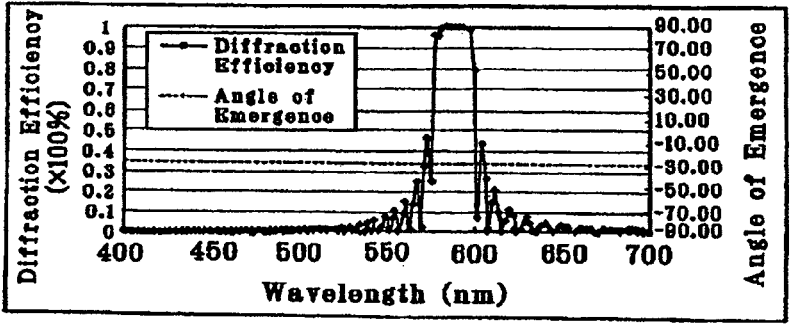
Figure 8A:
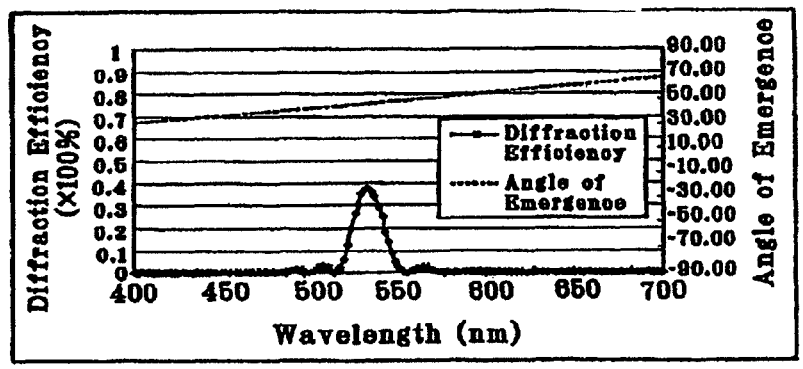
FIGS. 8(a), 8(b), 8(c) and 8(d) are illustrative of the volume hologram medium in yet another reconstruction state, similar to FIGS. 6(a), 6(b), 6(c) and 6(d).
Figure 8B:
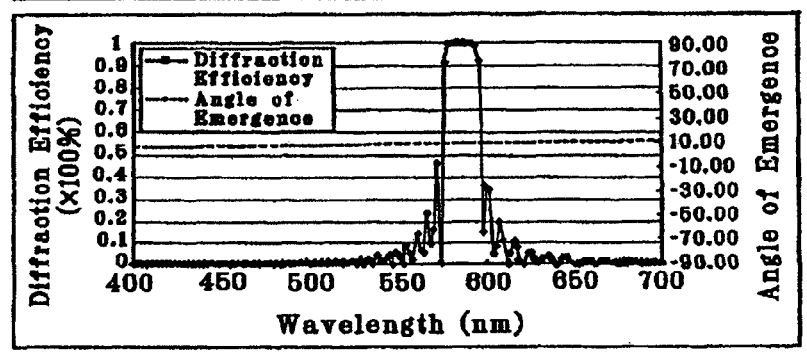
Figure 8C:
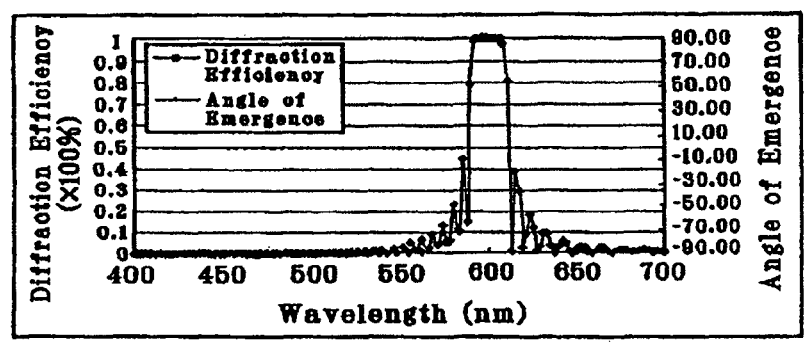
Figure 8D:
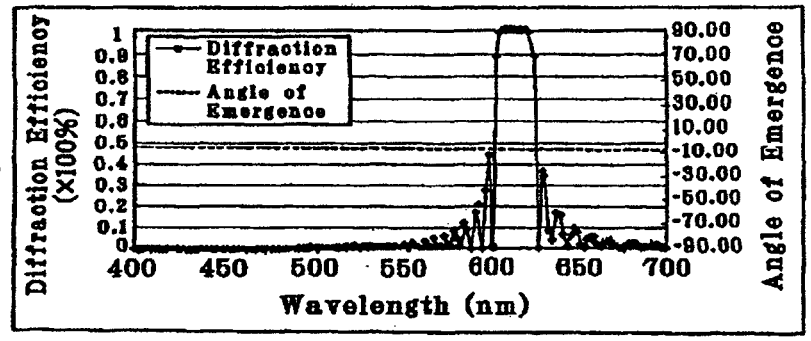

As described above, the plane pattern of the masked portion of the mask plate 22 is recorded in a hologram form using the one-dimensional diffuser 24. In the hologram in which the image of the plane pattern of the masked portion of the mask plate 22 is recorded, diffraction light 32'a, 32'b, 32'c, 32"a, 32"b, and 32"c also diffuses in the direction vertical to the plane of the paper (when the second input hologram 21" is recorded in the arrangement of FIG. 2(b)), unlike in a simple hologram mirror, as shown in FIG. 5(b), so that the field of view having an angle α is assured in the transverse direction. In addition, when the white illumination light 30 is incident on the hologram within the range having an angle α and at an angle in the transverse direction as shown in FIG. 5(c), too, only the image of the plane pattern of the masked portion of the mask plate 22 is reproduced for observation, because of the presence of some components incident in the direction of the viewer's eyeball E.

In the volume hologram medium 29' of the invention, the stereoscopic image of the three-dimensional object O and the image of the plane pattern of the mask plate 22 are thus recorded in a reflection form by interference of the same reference light beams having the same angle of incidence and wavelength and the object light beams having mutually different angles of incidence. Accordingly, the stereoscopic image of the three-dimensional object O is reconstructed in a single color and in an angular relation close to that for the recording conditions, and the image of the plane pattern of the mask plate 22 is reproduced at various angles of incidence of white illumination light 30 and in different colors depending on those angles of incidence, resulting in improvements in aesthetics as well as security that is ensured by judgment of whether or not such characteristics are obtained.

In the arrangement of FIG. 3, the volume hologram medium 29' is copied and recorded while the first input hologram 11' prepared in the process of FIGS. 1(a) and 1(b) is put on one second input hologram 21" prepared using the illumination light 25 at one specific angle of incidence θ' (−35° (case (a)), −45° (case (b)), and −55° (case (c)) in the step of FIG. 2(b). In the state of FIG. 4(a), FIG. 4(b), and FIG. 5(a)

of this hologram recording medium 29', any one of the diffraction light 32a, 32b and 32c, the diffraction light 32'a, 32'b and 32'c and the diffraction light 32"a, 32"b and 32"c, that is, only the diffraction light 32a, 32'a and 32"a, the diffraction light 32b, 32'b and 32"b or the diffraction light 32c, 32'c and 32"c is diffracted and reconstructed; all these light beams are not simultaneously diffracted. Another volume hologram medium 29' capable of diffracting those diffraction light beams simultaneously could be prepared as follows.

Figure 9:
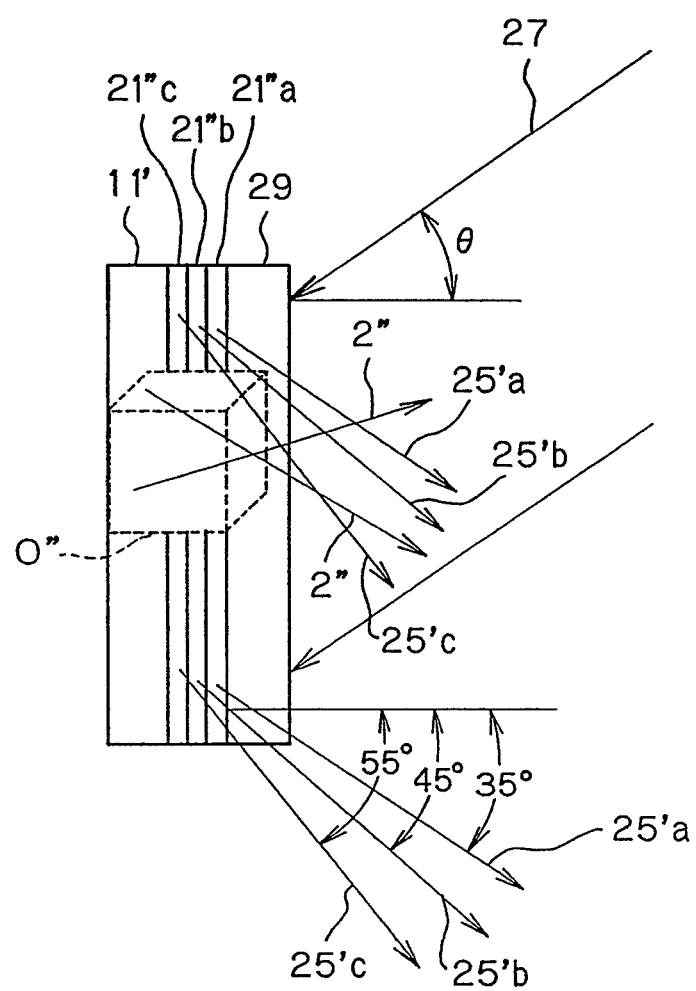
FIG. 9 is illustrative of how to fabricate a volume hologram medium according to another embodiment of the invention from one first input hologram and three second input holograms.

In the arrangement of FIG. 2(b), three hologram photosensitive materials 21' deactivated using the same mask plate 22 are first provided. Then, three input holograms 21"a, 21"b and 21"c are each prepared by recording the plane pattern image of the masked portion of the same mask plate 22 using illumination light 25 having the same wavelength λ at a different angle of incidence θ' (e.g., −35°, −45°, −55° as in the aforesaid embodiment) and the same reference light 25 at an angle of incidence θ (e.g., 45° as in the aforesaid embodiment). Then, as shown in FIG. 9, three such input holograms 21"a, 21"b and 21"c are put on the first input hologram 11' prepared at the steps of FIGS. 1(a) and 1(b). Subsequently, while a volume hologram photosensitive material 29 comprising another photopolymer is brought in close contact with the input hologram 21"a, the reference light 4 used to record the first input hologram 11' and illumination light 27 that propagates oppositely to the reference light 26 used to record the input holograms 21"a, 21"b and 21"c and has the same wavelength λ as that of the reference light 26 are entered in the assembly via the hologram photosensitive material 29. This then allows diffraction light 2" diffracted from the first input hologram 11' to reconstruct an image O" of a stereoscopic reconstructed image O' to interfere with the initially incident illumination light 27 to copy and record reflection hologram interference fringes for reproducing an image of the stereoscopic reconstructed image O", and the initially incident illumination light 27 to interfere with diffraction light 25'a, 25'b and 25'c that, upon incidence on the input holograms 21"a, 21"b and 21"c, is diffracted from portions of the mask plate 22 (corresponding to the masked portions of the mask plate 22) other then the portions deactivated by light 23, propagating oppositely to the illumination light 25 passing through the one-dimensional diffuser 24 used to record the input holograms 21"a, 21"b and 21"c, thereby providing multiple copying and recording in the hologram photosensitive material 21 of reflection hologram interference fringes for reconstructing the plane pattern image of the masked portion of the mask plate 22. Three sets of reflection hologram interference fringes for the reconstruction of the plane pattern image of the masked portion of the mask plate 22 are similar to those in the input holograms 21"a, 21"b and 21"c, providing uniform, parallel interference fringes in one section (that corresponds to a plane including the reference light 26 and illumination light 25 used to record the input holograms 21"a, 21"b and 21"c).

In the thus copied and recorded volume hologram medium 29', the diffraction light 32a, 32b and 32c, the diffraction light 32'a, 32'b and 32'c and the diffraction light 32"a, 32"b and 32"c are all simultaneously diffracted in the states of FIGS. 4(a) and 4(b) and FIG. 5(a). Accordingly, as the viewer's eyeball E is moved as indicated by a double-headed arrow solid line in FIG. 4(b) upon incidence of the white illumination light 30 on the volume hologram medium 29' at an angle of, e.g., 22.5° with respect to the normal thereto as shown in FIG. 4(b), the diffraction light 32'a, 32'b and 32'c strikes successively upon the viewer's eyeball E, so that the plane pattern image of the masked portion of the same mask plate 22 is visible while the color changes successively from yellow green (of around 575 nm) to yellow green close to yellow (of around 580 nm) to yellow (of around 590 nm). Alternatively, as the viewer's eyeball E is moved as indicated by an double-headed arrow solid line in FIG. 5(a) upon incidence of the white illumination light 30 on the volume hologram medium 29' from its frontal direction as shown in FIG. 5(a), the diffraction light 32"a, 32"b and 32"c strikes successively upon the viewer's eyeball E, so that the plane pattern image of the masked portion of the same mask plate 22 is visible while the color changes successively from yellow (of around 585 nm) to orange close to yellow (of around 600 nm) to orange (of around 615 nm). When, in FIGS. 4(b) and 5(a), the volume hologram medium 29' is moved as indicated by a double-headed arrow broken line while the viewer's eyeball E is fixed, the plane pattern image of the masked portion of the same mask plate 22 is again visible while the color changes successively, provided that there is some extent in the direction of incidence of the white illumination light 30.

Thus, in another volume hologram medium 29' of the invention, a plurality of plane pattern images of the same mask plate 22 are multi-recorded in the reflection form by interference of the same reference light beams having the same wavelength and the same angle of incidence with the object light beams having mutually different angles of incidence, so that the plurality of plane pattern images of the mask plate 22 can be reconstructed in the form of an image whose color changes successively at successively varying viewing positions relative to the volume hologram medium 29'. Thus, this volume hologram medium 29' is improved in terms of aesthetics, and ensures high security because whether or not it has such aesthetic properties can be judged. A stereoscopic image of the three-dimensional object O can also be multi-recorded in the volume hologram medium 29' by interference of the same reference light beams having the same angle of incidence and the same wavelength with object light beams having different angles of incidence, so that even much more improved aesthetics and security can be achieved.

Whether the volume hologram medium 29' fabricated in the arrangement of FIG. 3 or the volume hologram medium 29' fabricated in the arrangement of FIG. 9 allows the images of the three-dimensional object O and the plane pattern of the mask plate 22 to be triply recorded in R (red), G (green) and B (blue). In that case, when the plane image pattern of the masked portion of the mask plate 22 is viewed in the state of FIG. 4(b) or FIG. 5(a) as an example, the image is seen as an image whose color changes slightly depending on position. Thus, aesthetics are much more improved.

It is noted that at the step of fabricating the second input hologram 21" of FIG. 21(b), 21"a, 21"b or 21"c, the one-dimensional diffuser 24 is not always required. In the absence of the one-dimensional diffuser 24, however, such a transversely wide viewing field as shown in FIG. 5(b) or FIG. 5(c) cannot be ensured, and it is not possible to enter the white illumination light 30 in the hologram photosensitive material at an angle in the transverse direction, either.

As an alternative way of recording the first input hologram 11' of FIG. 1(b), use could be made of a reflection hologram recording process that relies on a one-step or two-step Denisyuk's arrangement.

As an alternative way of recording the second input hologram 21" of FIG. 2(b), 21"a, 21"b or 21"c, use could be made of a reflection hologram recording process in the Denisyuk's arrangement wherein a reflection type one-dimensional diffuser is used in place of the transmission type one-dimensional diffuser 24.

To ensure much more enhanced security, a plane pattern comprising micro-characters or painted designs used for securities, etc. could be recorded as the plane pattern used when recording the second input hologram 21", 21"*a*, 21"*b* or 21"*c*.

Further, a plane pattern comprising an array of lines or dots could be recorded as the plane pattern used when recording the second input hologram 21", 21"*a*, 21"*b* or 21"*c*.

In this case, a pattern film with lines or dots drawn thereon at the same pitch as that of the lines or dots in the above plane pattern is superposed on the volume hologram medium 29', as set forth in Patent Publication 2, thereby observing moiré fringes created between the lines or dots in the plane pattern and the lines or dots on the pattern film. In this way, whether the volume hologram medium 29' is genuine or fake can be judged making use of the shape and the presence or absence of the area where the moiré fringes are found.

In order to facilitate such authentication, it is desired to record the plane pattern image in such a way that the reconstructed image of the plane pattern is formed in the vicinity of the hologram plane of the volume hologram medium 29'.

While the volume hologram medium of the invention has been described with reference to some preferred embodiments, it is understood that the invention is in no sense limited thereto, and many modifications may be possible.

In one volume hologram medium of the invention described herein, the image of a three-dimensional object and the image of a plane pattern are multi-recorded in a reflection hologram form by interference of the same reference light beams having the same angle of incidence and the same wavelength with object light beams having mutually different angles of incidence, so that the stereoscopic image of the three-dimensional object can be reconstructed in angle relations close to the recording conditions and in a single color, and the image of the plane pattern can be reconstructed at various angles of incidence of white illumination light and in colors varying depending on those angles of incidence. It is thus possible to provide a volume hologram medium having improved aesthetics, wherein much more enhanced security is ensured by determination of whether or not the volume hologram medium has such aesthetic properties.

In another volume hologram medium of the invention, a plurality of plane pattern images are multi-recorded as a reflection hologram by interference of the same reference light beams having the same angle of incidence and the same wavelength with object light beams having mutually different angles of incidence, so that the plurality of plane pattern images can be reconstructed in the form of an image whose color changes successively at successively varying viewing positions relative to the volume hologram medium. It is thus possible to provide a volume hologram medium having improved aesthetics, wherein much more enhanced security is ensured by determination of whether or not the volume hologram medium has such aesthetic properties.

I claim:

1. A volume hologram medium, wherein a hologram of an image of a three-dimensional object and a hologram of an image of a plane pattern are multi-recorded in a reflection hologram form by interference of reference light beams having same angle of incidence and same wavelength with a first and second object light beams having mutually different angles of incidence
   wherein the hologram of said image of the plane pattern is selectively recorded in only an area corresponding to said plane pattern and as a hologram comprising parallel interference fringes in the area at an angle with respect to at least a recording plane
   wherein the image of the three-dimensional pattern is reconstructed in one color at a replay angle approximately the same as the reference light beam as during recording of the hologram of the image;
   wherein the hologram of the image of the plane pattern is reconstructed at an angle of incidence corresponding to a white illumination light and
   in different colors depending on the angle of incidence,
   wherein said area includes
   a normal to said recording plane, said hologram of said image of the plane pattern is recorded in such an angle relation that second object light and reference light are incident on said recording plane at substantially identical angles of incidence with respect to said normal to said recording plane from mutually opposite directions between said recording plane is, and a hologram of said image of a three-dimensional object is recorded in such an angle relation that a center light ray of said first object light is substantially vertically incident on said recording plane
   wherein the hologram of said image of the plane pattern is reconstructed at varying angles of incidence of the white illumination light in a color having a wavelength longer that than recording wavelength depending on angles of incidence,
   wherein the hologram of said image of the plane pattern is reconstructed at varying angles of incidence of the white illumination light with a peak value of 100% even when replayed at a conditions different from the hologram-recording conditions,
   wherein the hologram of the image of the plane pattern comprises interference fringes that are mutually parallel and uniform in said area at a slant angle parallel to the ½ angle between the second object light and the reference light in a hologram photosensitive material
   wherein the hologram of the plane pattern image is recorded by interference of the second object and the light and reference light crossing at right angles in said area via a one-dimensional diffusion plate and
   wherein the hologram of the image of the plane pattern is viewable at the same wavelength over a viewing angle ($\alpha$) oriented in a direction to orthogonal to the recording plane
   wherein the angle of incidence ($\theta$) and an angle of diffraction ($\theta'$) range from +45 degrees to −55 degrees.

2. The volume hologram medium according to claim 1, wherein said image of the plane pattern is an image of a painted design or micro-characters.

3. The volume hologram medium according to claim 1, wherein said image of the plane pattern is an image of an array of lines or dots.

4. The volume hologram medium according to claim 1, wherein at least one of the hologram of said image of the three-dimensional object and the hologram of said image of the plane pattern is multi-recorded at two or more different wavelengths.

5. The volume hologram medium according to claim 1, wherein the hologram of photosensitive material comprises a photopolymer.

6. A volume hologram medium, wherein a plurality holograms of plane pattern images are multi-recorded as a reflection hologram by interference of the reference light beams having the same angle of incidence and the same wavelength with a second and further object light beams having mutually different angles of incidence,
   wherein the holograms of at least one of the planar pattern images is reconstructed at an angle relation approximately equal to an angle relation during recording;

wherein at least another planar image comprising parallel interference fringes is created in an area that makes an angle with the recording plane;

wherein the holograms of the another of the planar pattern images is reconstructed at the angle of incidence of white illumination light and in different colors depending on the angle of incidence wherein an image of a three-dimensional object is multi-recorded by interference of a second reference light having the same angle of incidence and wavelength as those of said reference light used for recording said plurality of plane pattern images with first object light having an angle of incidence different from that of said second and further object light used for recording to said plurality of plane pattern images, wherein each hologram of said plurality of plane pattern images is selectively recorded in only the area corresponding to each plane pattern, wherein the hologram of said plurality of plane pattern images comprise an image of the same plane pattern wherein the holograms of each of said images of the plane pattern is reconstructed at varying angles of incidence of a white illumination light in a color having a wavelength longer that than recording wavelength depending on angles of incidence, wherein the holograms of each of said images of the plane pattern is reconstructed at varying angles of incidence of the white illumination light with a peak value of 100% even when replayed at conditions different from the hologram-recording conditions, wherein each of the plurality of holograms of plane pattern images comprises interference fringes that are mutually parallel and uniform in the area at a slant angle parallel to the ½ angle between the second or further object light and the reference light in a hologram photosensitive material wherein each of the plurality of holograms of plane pattern images is recorded by interference of object light and reference light crossing at right angles with said area said section via a one-dimensional diffusion plate and wherein each of the plurality of holograms of plane pattern images is viewable at the same wavelength over a viewing angle (α) oriented in a direction to orthogonal to the recording plane.

7. The volume hologram medium according to claim 6, wherein the hologram of said plurality of plane pattern images are multi-recorded at two or more different wavelengths.

8. A method for authentication of a volume hologram medium having a hologram of an image of a three-dimensional object and a hologram of at least one image of a plane pattern multi-recorded in a reflection hologram form by interference of reference light beams having the same angle of incidence and the same wavelength with a first and second object light beams having mutually different angles of incidence, wherein: an image of an array of lines or dots is recorded as said image of the plane pattern, and a pattern film on which an array of lines or dots is drawn at the same pitch as that of said plane pattern comprising an array of lines or dots is brought in alignment with said volume hologram medium, so that said volume hologram medium can be authenticated with moire fringes created between said image of at least one plane pattern and the pattern film comprising an array of lines or dots on said pattern film wherein the hologram of at least one image of the plane pattern is reconstructed in an angle relation approximately equal to an angle relation during recording;

wherein the hologram of at least one image of the plane pattern comprising parallel interference fringes is created in an area that makes an angle with the recording plane;

wherein the holograms of at least one image of the plane pattern is reconstructed at the angle of incidence of a white illumination light and in different colors depending on the angle of incidence wherein said at least one image of the plane pattern is reconstructed at varying angles of incidence of the white illumination light in a color having a wavelength longer that than recording wavelength depending on angles of incidence, wherein the hologram of said image of a plane pattern is reconstructed at varying angles of incidence of the white illumination light with a peak value of 100% even when replayed at conditions different from the hologram-recording conditions, wherein the hologram of the plane pattern image comprises interference fringes that are mutually parallel and uniform in one section at a slant angle parallel to the ½ angle between the second or further object light and the reference light in a hologram photosensitive material wherein the hologram of the plane pattern image is recorded by interference of the second object and the light and reference light crossing at right angles with said area via a one-dimensional diffusion plate and wherein the hologram is viewable at the same wavelength over a viewing angle (α) oriented in a direction to orthogonal to the recording plane.

9. The method for authentication of a volume hologram medium according to claim 8, wherein the hologram of the image of the plane pattern multi-recorded in the reflection hologram is recorded in such a way as to be re-constructible near the of said volume hologram medium.

* * * * *